United States Patent Office 3,160,472
Patented Dec. 8, 1964

3,160,472
AGGLOMERATION OF POWDERED
TRIPOLYPHOSPHATES
Joe S. Metcalf, Webster Groves, and Chung Yu Shen, Olivette, Mo., assignors to Monsanto Company, a corporation of Delaware
No Drawing. Filed May 6, 1960, Ser. No. 27,262
9 Claims. (Cl. 23—106)

This invention relates to the production of alkali metal tripolyphosphates. More particularly, it relates to a novel method for agglomerating alkali metal tripolyphosphates, such as sodium, potassium, etc., tripolyphosphates.

Several processes for the production of granulated or agglomerated alkali metal tripolyphosphates have been developed and are familiar to those skilled in the art. These processes, however, almost invariably produce materials which contain some very small particles. The small particles cause dustiness and nasal irritation, etc. if they are not separated from the more desirable granular fractions. Since powdered tripolyphosphate is an article of commerce, these dust-causing small particles are usually separated from the agglomerated product by screening, milled to the desired size, packaged, and then sold as the powdered tripolyphosphate. Often such powdered product cannot be sold immediately. Therefore, the producer of tripolyphosphate must either store the powder or convert it to some more useful form. It has now been found that powdered tripolyphosphate can be converted to a more useful, agglomerated form by a novel improvement in the calcining process. This improvement is discussed below.

The discovery upon which this invention is predicated is that when a finely divided alkali metal tripolyphosphate is calcined in the presence of at least about 10 percent of certain blends of alkali metal orthophosphate salts, an appreciable proportion of the alkali metal tripolyphosphate is agglomerated. This is particularly surprising because calcination of the finely divided alkali metal tripolyphosphate alone, under otherwise the same conditions, does not yield an agglomerated product.

In the practice of the instant invention, the orthophosphate salt blend which is mixed with the finely divided alkali metal tripolyphosphate is composed of a combination of alkali metal orthophosphates, such as (where M is the alkali metal) $M_3PO_4$, $M_2HPO_4$, $MH_2PO_4$, and double salts such as $MH_2PO_4 \cdot M_2HPO_4$, which are blended so that the overall molar ratio of $M_2O$ to $P_2O_5$ in the blend is more than about 1.5 and less than 2.0, and preferably between about 1.6 and about 1.75. In order to make a tripolyphosphate that is high in assay, a blend of orthophosphates in which the overall molar ratio of $M_2O$ to $P_2O_5$ is between about 1.65 and about 1.69 is used. Any blend of alkali metal orthophosphate salts, the overall molar ratio ($M_2O$ to $P_2O_5$) of which lies within any one of the ranges described above, is hereinafter referred to as the "appropriate" orthophosphate salt blend.

Examples of appropriate orthophosphate salt blends are as follows:

(1) 65 weight percent monosodium orthophosphatedisodium orthophosphate double salt and 35 weight percent disodium orthophosphate.
(2) 60 weight percent monosodium orthophosphatedisodium orthophosphate double salt and 40 weight percent disodium orthophosphate dihydrate.
(3) 25 weight percent monosodium orthophosphate and 75 weight percent disodium orthophosphate.
(4) 22 weight percent monosodium orthophosphate and 78 weight percent disodium orthophosphate dihydrate.
(5) 39 weight percent monosodium orthophosphate and 61 weight percent trisodium orthophosphate dodecahydrate.
(6) 28 weight percent monopotassium orthophosphate and 72 weight percent dipotassium orthophosphate.
(7) 56 weight percent monopotassium orthophosphate and 44 weight percent tripotassium orthophosphate.
(8) The double salt hydrate, $KH_2PO_4 \cdot 2K_2HPO_4 \cdot H_2O$
(9) The orthophosphate salt blend prepared by reacting $Na_2CO_3$ with $H_3PO_4$ so that the molecular ratio of $Na_2CO_3$ to $P_2O_5$ is 1.68.

The calcination of the present invention is carried out at a temperature below the melting point of the particular tripolyphosphate involved, but at a sufficiently high temperature to effect the conversion of the orthophosphates to tripolyphosphate. In general, this calcination will be carried out between about 275° C. and about 550° C., and preferably between about 325° C. and about 500° C.

The amount of the appropriate alkali metal orthophosphate salt blend which is calcined with the finely divided tripolyphosphate can be varied considerably. For example, at least about 10% by weight (based on the total weight of the mixture of orthophosphates plus tripolyphosphate) but usually less than about 95% by weight of the appropriate orthophosphate blend is used. It is preferred, however, that at least about 25% by weight of the appropriate orthophosphate salt blend be present in the orthophosphate-tripolyphosphate mixture which is calcined. It is particularly desirable to calcine a mixture of orthophosphates plus tripolyphosphate which contains between about 40% and about 60% by weight of the appropriate orthophosphate blend, based on the weight of the total orthophosphate-tripolyphosphate mixture.

A particulated, agglomerated alkali metal tripolyphosphate product can be manufactured in accordance with the present invention by continuously agitating and jostling and tumbling the particles of orthophosphates and tripolyphosphate together during the calcination step of these processes.

An excellent type of continuous agitation, where jostling and tumbling together of the particles of alkali metal orthophosphate salts and alkali metal tripolyphosphate occur, is produced when a rotary calciner such as that described in Example 1, below, is utilized in the practice of the instant invention. Although external heating of the rotary calciner is illustrated in Example 1, either external or internal heating can be used with equally desirable results. A combination of external and internal methods of heating the rotary calciner can also be used.

Another example of the type of agitation which can be applied during the calcination of the orthophosphate-tripolyphosphate mixture in order to obviate a grinding step subsequent to the calcination step is that produced in an indirectly heated screw conveyor. For example, heat is applied to the outer shell of the conveyor, transferred through the shell and to the orthophosphate-tripolyphosphate mixture which is being moved from one end of an approximately horizontal conveyor to the other by means of a rotating screw. The rotation of the screw pushes and jostles the particles, almost continuously, and produces an agglomerated tripolyphosphate product which can often be utilized directly, without having to be ground.

Still another method of applying agitation to the orthophosphate-tripolyphosphate mixture while it is being calcined is by means of a vibrating conveyor. The jostling and tumbling together of particles on a vibrating conveyor are produced by the vibrating action. Here, again, heat can be applied either directly onto the surface of the bed of agitated particles or indirectly, for example, by heating the conveyor itself, which in turn transfers the heat to the orthophosphate-tripolyphosphate mixture.

It should be noted that the above examples are described merely to illustrate the types of agitation which will most often be used in the practice of this invention.

They are in no way intended to limit the scope of this invention.

While the actual particle sizes of the calciner feed materials (orthophosphates and tripolyphosphates) are not critical for the practice of the instant invention, generally relatively small particles are preferred. For example, satisfactory agglomerated products are produced if at least about 80%, by weight, of the calciner feed materials will pass through a U.S. Standard 60 mesh screen. However, it is preferred that at least about 80%, by weight, of the calciner feed materials pass through a U.S. Standard 100 mesh screen.

One will note that in the following examples, which demonstrate the tripolyphosphate agglomeration process of the instant invention, one screen fraction (−20, +100 mesh) is termed the "desirable" screen fraction, while both the oversize (+20 mesh) and the undersize (−100 mesh) are termed "undesirable." This terminology is chosen merely to serve as a guide, so that this novel invention might be more easily understood.

PREPARATION OF THE ORTHOPHOSPHATE FEED BLEND

An orthophosphate feed blend is prepared by reacting $Na_2CO_3$ with 85% $H_3PO_4$ to give an $Na_2O$ to $P_2O_5$ molar ratio of 5 to 3. The resulting slurry is dried at 110° C. overnight and then milled to pass through a U.S. Standard 100 mesh screen. The resulting essentially anhydrous orthophosphate feed blend is stored in airtight containers until it is used in the following examples.

*Example 1*

One hundred fifty grams of the othrophosphate blend prepared above are charged into a 6-inch diameter by 9-inch long stainless steel drum rotated at 40 r.p.m. One hundred fifty grams of sodium tripolyphosphate powder which had been passed through a U.S. Standard 100 mesh screen are added. The drum is heated externally by a gas burner. Its outer wall temperature is maintained at 400° C. during a 30 minute calcination. Any material which cakes on the walls of the drum as it revolves is knocked down with a small hammer. After the calcination, the sodium tripolyphosphate product is discharged, cooled to room temperature, and screened. The screen analysis of the product shows that a total of 153.9 grams of desirable (−20, +100 mesh) agglomerated product is produced.

Calcination of the same amount of the orthophosphate blend under the same conditions, but without the addition of the tripolyphosphate to the calciner, yields only 106.8 grams of −20, +100 mesh desirable product.

Calcination of sodium tripolyphosphate alone yields no agglomerated product at all.

*Example 2*

Two hundred twenty-five grams of a finely divided orthophosphate salt blend (composed of 22 weight percent monosodium orthophosphate plus 78 weight percent disodium orthophosphate) are calcined with seventy-five grams of finely divided (−100 mesh) sodium tripolyphosphate, using the procedure described in Example 1. This calcination produces 197.4 grams of −20, +100 mesh desirable product.

Calcination of two hundred twenty-five grams of the orthophosphate salt blend without the addition of sodium tripolyphosphate to the calciner, but otherwise using the same procedure, results in the production of only 160.4 grams of −20, +100 mesh desirable product.

*Example 3*

In a continuous process equal quantities by weight of the appropriate sodium orthophosphate salt blend and sodium tripolyphosphate are delivered into a rotary calciner which is maintained at 400° C. The feed rates and rate of revolution of the calciner are adjusted so that passage through the calciner is completed in 35 minutes. The product of calcination is then screened over U.S. Standard 20 and 100 mesh screens. The −20, +100 mesh desirable product is withdrawn. It represents 51% by weight of the total product issuing from the calciner. It represents 102% by weight, however, of the total orthophosphate salt blend fed to the calciner. By comparison, calcination of this sodium orthophosphate salt blend in the absence of sodium tripolyphosphate (but in the same calciner and under otherwise the same conditions) produces only 71% by weight of product having the desired particle size.

The +20 mesh "oversize" fraction from the calciner is then ground to pass through a 100 mesh screen and combined with the −100 mesh "undersize" fraction. The combined "oversize" and "undersize" fractions represent 49% by weight of the total product issuing from the calciner. This combined "undesirable" portion of the calciner effluent is recycled into the finely divided sodium tripolyphosphate feed stream to the calciner. When this combined "undesirable" portion of the calciner effluent is continuously recycled into the sodium tripolyphosphate feed stream, the process is one which produces only the desirable agglomerated product.

Obviously, modifications and variations of the invention as hereinbefore set forth may be made without departing from the spirit and scope thereof.

What is claimed is:

1. A process for agglomerating alkali metal tripolyphosphate which comprises (a) heating a mixture of finely divided alkali metal tripolyphosphate with a blend of finely divided alkali metal orthophosphate salts, where the overall molar ratio of alkali metal oxide to $P_2O_5$ of said blend of finely divided alkali metal orthophosphate salts is greater than about 1.5 and less than 2.0, and said blend of finely divided alkali metal orthophosphate salts represents between about 10% and about 75% by weight, of the total weight of the combined orthophosphates and tripolyphosphate, said heating being conducted while said mixture is being agitated at a temperature which is sufficiently high to effect the conversion of alkali metal orthophosphates to alkali metal tripolyphosphate, but below the melting point of the alkali metal tripolyphosphate, to thereby produce a particulated agglomerated form of the alkali metal tripolyphosphate, and (b) separating the resulting calcined material into a plurality of fractions based on the particle size distribution of said calcined material, at least one of said fractions consisting of relatively small particles and at least one of said fractions consisting of relatively larger particles, as compared with said relatively small particles.

2. A process for agglomerating sodium tripolyphosphate which comprises (a) heating finely divided sodium tripolyphosphate with between about 25% and about 75% by weight of a blend of finely divided sodium orthophosphate salts, where the overall molar ratio of $Na_2O$ to $P_2O_5$ of said sodium orthophosphate salt blend is greater than about 1.6 and less than about 1.75, and said percentage by weight of sodium orthophosphate salt blend is based on the total weight of the combined orthophosphates and tripolyphosphate, said heating being conducted with agitation, at a temperature within the range of from about 275° C. to about 550° C., to produce a particulated agglomerated form of the sodium tripolyphosphate and (b) separating the resulting calcined material into a plurality of fractions based on the particle size distribution of said calcined material, at least one of said fractions consisting of relatively small particles and at least one of said fractions consisting of relatively larger particles, as compared with said relatively small particles.

3. A process for agglomerating sodium tripolyphosphate which comprises (a) mixing from about 40% to about 60% by weight of finely divided sodium tripolyphosphate with a blend of finely divided anhydrous sodium orthophosphate salts, where the overall molar ratio of $Na_2O$ to $P_2O_5$ of the said blend of sodium orthophosphate salts is between about 1.6 and about 1.75, and the said percentage by weight of sodium tripolyphosphate is based on the total weight of the combined sodium orthophosphates and sodium tripolyphosphate, (b) heating said mixture of sodium tripolyphosphate plus sodium orthophosphate salts, with agitation, at a temperature between about 325° C. and about 500° C. to produce a particulated agglomerated form of sodium tripolyphosphates (c) separating the resulting calcined material into a plurality of fractions based on the particle size distribution of said calcined material, at least one of said fractions consisting of relatively small particles and at least one of said fractions consisting of relatively larger particles, as compared with said relatively small particles and (d) withdrawing from said process an agglomerated product, said agglomerated product being at least one of said fractions consisting of relatively larger particles.

4. A continuous process for agglomerating alkali metal tripolyphosphate which comprises heating with agitation in a heating zone at a temperature between about 325° C. and about 500° C. a mixture of (1) between about 25% and about 60% by weight of finely divided sodium tripolyphosphate and (2) a blend of finely divided sodium orthophosphate salts having an overall molar ratio of $Na_2O$ to $P_2O_5$ between about 1.6 and about 1.75, where the said percentage by weight of sodium tripolyphosphate is based on the total weight of the combined sodium orthophosphates and sodium tripolyphosphate until conversion of the orthophosphates to tripolyphosphate is effected, withdrawing the calcined material from said heating zone, separating the calcined material into a plurality of fractions based on the particle size distribution of said calcined material, at least one of the said fractions consisting of relatively smaller particles and at least one of the said fractions consisting of relatively larger, agglomerated particles (as compared with said relatively smaller particles), recovering at least one fraction of said relatively larger particles from said process, and reintroducing at least one fraction of calcined material consisting of relatively smaller particles into the aforesaid heating zone along with a blend of finely divided sodium orthophosphate salts having an overall molar ratio of $Na_2O$ to $P_2O_5$ between about 1.6 and about 1.75, at least about 80 weight percent of which reintroduced fraction of calcined material being of a particle size sufficiently small to pass through a U.S. Standard 60 mesh screen.

5. A continuous process for agglomerating anhydrous sodium tripolyphosphate which comprises heating with agitation in a heating zone at a temperature between about 275° C. and about 550° C. with agitation, a mixture of (1) between about 40% and about 60% by weight of finely divided anhydrous sodium tripolyphosphate and (2) a blend of finely divided sodium orthophosphate salts having an overall molar ratio of $Na_2O$ to $P_2O_5$ between about 1.65 and about 1.69, where the said percentage by weight of sodium tripolyphosphate is based on the total weight of the combined sodium tripolyphosphate and sodium orthophosphates, until conversion of the orthophosphates to tripolyphosphate is effected, withdrawing the calcined material from the aforesaid heating zone, separating the calcined material into a plurality of fractions based on the particle size distribution of said calcined material, at least one of the said fractions consisting of relatively smaller particles and at least one of the said fractions consisting of relatively larger, agglomerated particles (as compared with said relatively smaller particles), recovering at least one fraction of said relatively larger particles from said process, and reintroducing at least one fraction of calcined material consisting of relatively smaller particles into the aforesaid heating zone along with a blend of finely divided sodium orthophosphate salts having an overall molar ratio of $Na_2O$ to $P_2O_5$ between about 1.65 and about 1.69, at least about 80 weight percent of which reintroduced fraction of calcined material having a particle size sufficiently small to pass through a U.S. Standard 100 mesh screen.

6. A process for converting finely divided, unagglomerated anhydrous sodium tripolyphosphate to particulated, agglomerated sodium tripolyphosphate which comprises the step of calcining, with continuous agitation and at a temperature between about 325° C. and about 500° C., a mixture containing an amount of −100 mesh anhydrous unagglomerated sodium tripolyphosphate equal to from about 40 to about 60 weight percent of said mixture and an amount equal to from about 60 to about 40 weight percent, based on the weight of said mixture, of a finely divided blend of monosodium orthophosphate and disodium orthophosphate; said blend having an overall molar ratio of $Na_2O$ to $P_2O_5$ between about 1.6 and about 1.75; whereby at least some of said −100 mesh sodium tripolyphosphate is converted to the particulated, agglomerated form.

7. In a process for manufacturing particulated, agglomerated sodium tripolyphosphate, which process comprises the step of calcining a blend of finely divided sodium orthophosphate salts having an $Na_2O:P_2O_5$ ratio between about 1.6 and about 1.75 at a temperature within the range of from about 275° C. to about 550° C. and with continuous agitation during said calcining, to thereby convert said sodium orthophosphate salts to sodium tripolyphosphate, the improvement which comprises calcining a mixture of said blend and an amount of finely divided sodium tripolyphosphate equal to from about 5 weight percent to about 90 weight percent, based on the weight of said mixture; whereby at least some of said finely divided sodium tripolyphosphate is converted to the particulated, agglomerated form.

8. In a process for manufacturing particulated, agglomerated sodium tripolyphosphate, which process comprises the step of calcining with continuous agitation a finely divided blend of monosodium orthophosphate and disodium orthophosphate having an $Na_2O/P_2O_5$ ratio of about 1.67 at a temperature within the range of from about 325° C. to about 500° C. to thereby convert said blend into sodium tripolyphosphate, the improvement which comprises intermixing with said blend an amount of finely divided unagglomerated sodium tripolyphosphate equal to from about 40 to about 60 weight percent of the total weight of the combined monosodium orthophosphate, disodium orthophosphate and sodium tripolyphosphate; whereby a particulated, agglomerated product containing significantly less than that amount of finely divided unagglomerated sodium tripolyphosphate originally added is produced.

9. An improved process as in claim 8, wherein at least about 80 weight percent of the particles of said monosodium orthophosphate, said disodium orthophosphate and said sodium tripolyphosphate are small enough to pass through a U.S. Standard 100 mesh screen.

References Cited in the file of this patent

UNITED STATES PATENTS

| | | |
|---|---|---|
| 2,419,148 | King | Apr. 15, 1947 |
| 2,709,649 | Le Baron | May 31, 1955 |
| 2,776,187 | Pfengle | Jan. 1, 1957 |
| 2,920,939 | Edwards | Jan. 12, 1960 |
| 3,030,180 | Bigot | Apr. 17, 1962 |